US010887370B2

(12) United States Patent
Cordonnier

(10) Patent No.: US 10,887,370 B2
(45) Date of Patent: Jan. 5, 2021

(54) VISUAL REPRESENTATION OF A USER INTERFACE

(71) Applicant: TRADING TECHNOLOGIES INTERNATIONAL INC., Chicago, IL (US)

(72) Inventor: Brian M. Cordonnier, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 547 days.

(21) Appl. No.: 14/576,181

(22) Filed: Dec. 18, 2014

(65) Prior Publication Data

US 2016/0182602 A1 Jun. 23, 2016

(51) Int. Cl.
| G06F 3/00 | (2006.01) |
| H04L 29/08 | (2006.01) |
| G06F 3/0482 | (2013.01) |
| G06F 3/0484 | (2013.01) |
| G06Q 40/04 | (2012.01) |
| G06F 3/01 | (2006.01) |
| G06F 3/0481 | (2013.01) |

(52) U.S. Cl.
CPC .......... H04L 67/025 (2013.01); G06F 3/0482 (2013.01); G06F 3/0484 (2013.01); G06Q 40/04 (2013.01); G06F 3/04812 (2013.01)

(58) Field of Classification Search
CPC ... G06F 3/0482; G06F 3/0484; H04L 67/025; G06Q 40/04
See application file for complete search history.

(56) References Cited

U.S. PATENT DOCUMENTS

| 6,271,839 | B1 * | 8/2001 | Mairs | G06F 3/1462 |
| | | | | 715/807 |
| 7,454,708 | B2 * | 11/2008 | O'Neal | G06F 3/0481 |
| | | | | 715/730 |
| 7,765,483 | B2 * | 7/2010 | Schmieder | G06F 9/54 |
| | | | | 715/751 |
| 2002/0138389 | A1 * | 9/2002 | Martone | G06F 16/95 |
| | | | | 705/36 R |
| 2003/0041000 | A1 * | 2/2003 | Zajac | G06Q 40/04 |
| | | | | 705/37 |

(Continued)

OTHER PUBLICATIONS

International Search Report and Written Opinion for Int. App. No. PCT/US2015/065499, dated Feb. 9, 2016.

*Primary Examiner* — Nicholas Augustine
(74) *Attorney, Agent, or Firm* — McDonnell Boehnen Hulbert & Berghoff LLP

(57) ABSTRACT

A visual representation may be displayed at a computing device to indicate a display configuration and/or user interactions associated with a user interface for an application that may be run on other computing devices. The visual representation of the user interface may be determined based on user interface information, which may be logged at the computing device on which the application may be run. The visual representation of the user interface may include data obtained from a remote data source. The data may include market data that may be obtained from an electronic exchange that is shared with the computing device on which the application may be run for displaying the user interface.

19 Claims, 15 Drawing Sheets

(56) References Cited

U.S. PATENT DOCUMENTS

| | | | |
|---|---|---|---|
| 2005/0015324 A1* | 1/2005 | Mathews | G06Q 40/04 705/37 |
| 2006/0031779 A1* | 2/2006 | Theurer | G06F 3/1454 715/781 |
| 2008/0154764 A1* | 6/2008 | Levine | G06Q 40/04 705/37 |
| 2008/0162378 A1* | 7/2008 | Levine | G06Q 40/04 705/36 R |
| 2009/0132316 A1* | 5/2009 | Florance | G06Q 30/06 701/532 |
| 2010/0076906 A1* | 3/2010 | Eubank | G06Q 40/06 705/36 R |
| 2010/0076907 A1* | 3/2010 | Rosenthal | G06Q 40/04 705/36 R |
| 2010/0138357 A1* | 6/2010 | Mufti-Bey | G06Q 40/06 705/36 R |
| 2010/0218136 A1* | 8/2010 | Tyulyaev | G06Q 40/06 715/781 |
| 2010/0293110 A1* | 11/2010 | Rosenthal | G06Q 40/06 705/36 R |
| 2011/0173114 A1* | 7/2011 | Annunziata | G06Q 40/04 705/37 |
| 2012/0016868 A1 | 1/2012 | Wagenblatt | |
| 2015/0082157 A1* | 3/2015 | Zhang | G06F 9/543 715/255 |
| 2015/0120685 A1* | 4/2015 | Burckart | G06F 16/219 707/695 |
| 2015/0134629 A1* | 5/2015 | Knobloch | G06F 16/958 707/695 |
| 2015/0134661 A1* | 5/2015 | Circlaeys | G06F 16/438 707/737 |
| 2015/0199374 A1* | 7/2015 | Bottner | G06F 16/176 707/608 |
| 2015/0278323 A1* | 10/2015 | Melahn | G06F 16/178 707/610 |
| 2015/0301806 A1* | 10/2015 | Leon | G06F 9/45512 717/113 |
| 2015/0331841 A1* | 11/2015 | Antebi | G06F 16/1834 715/229 |
| 2015/0370767 A1* | 12/2015 | Sevilmis | G06F 16/24552 715/255 |

* cited by examiner

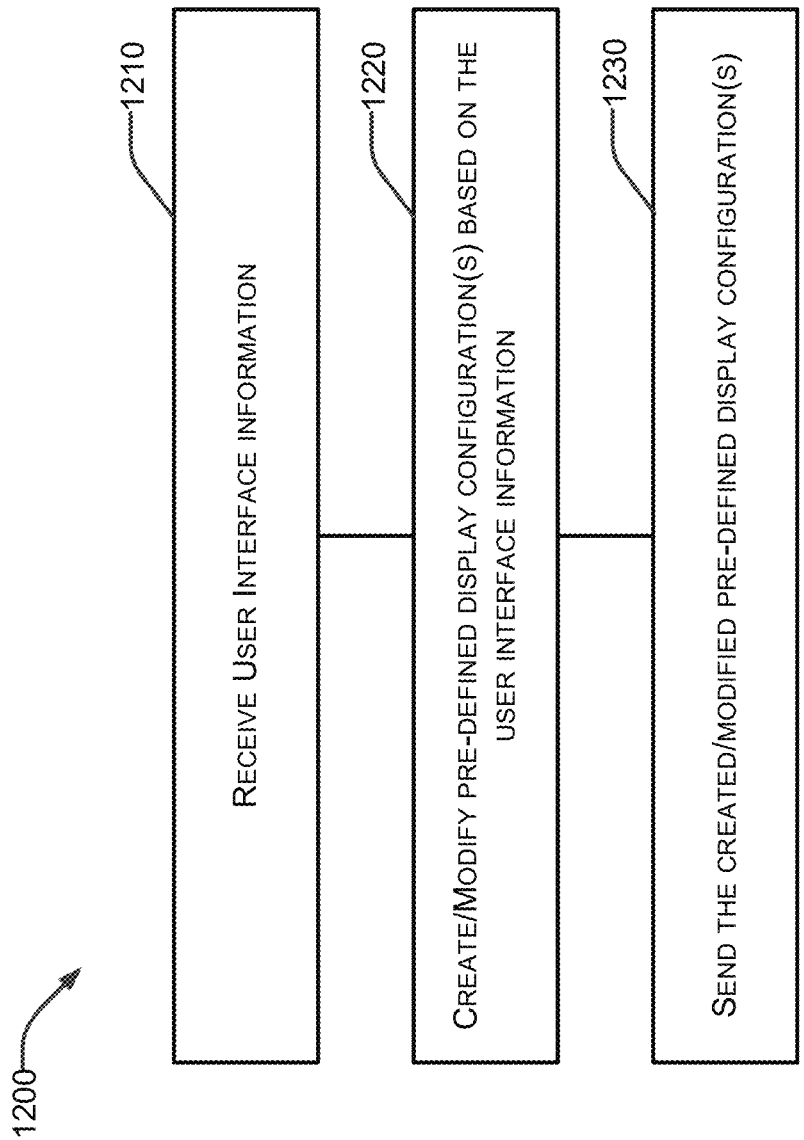

VISUAL REPRESENTATION OF A USER INTERFACE

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading device may execute an application, such as a trading application, which may provide information and functionality to a user via a user interface. For example, the user interface may include one or more application windows, such as trading windows, market information, application functions, such as buttons or text boxes, and/or the like. A user may configure the information and functionality in the user interface in a way that is beneficial to the user and store the configuration in a user profile, such that the preferred information and functionality provided by the user interface can be consistently provided in a configuration preferred by the user.

Knowledge of the user's preferred functions and configurations in the user interface may be beneficial, such as when developing the application and/or providing technical support to a user of the application. User-preferred functions and/or configurations in a user interface may, however, be difficult to determine. Due to the different user configurations in the user interface, it may also be difficult to provide technical support or troubleshooting for a user at the trading device.

BRIEF DESCRIPTION OF THE FIGURES

Certain embodiments are disclosed with reference to the following drawings.

FIG. 12 illustrates an example method for creating and/or modifying display configurations of user interfaces.

Figure 1:
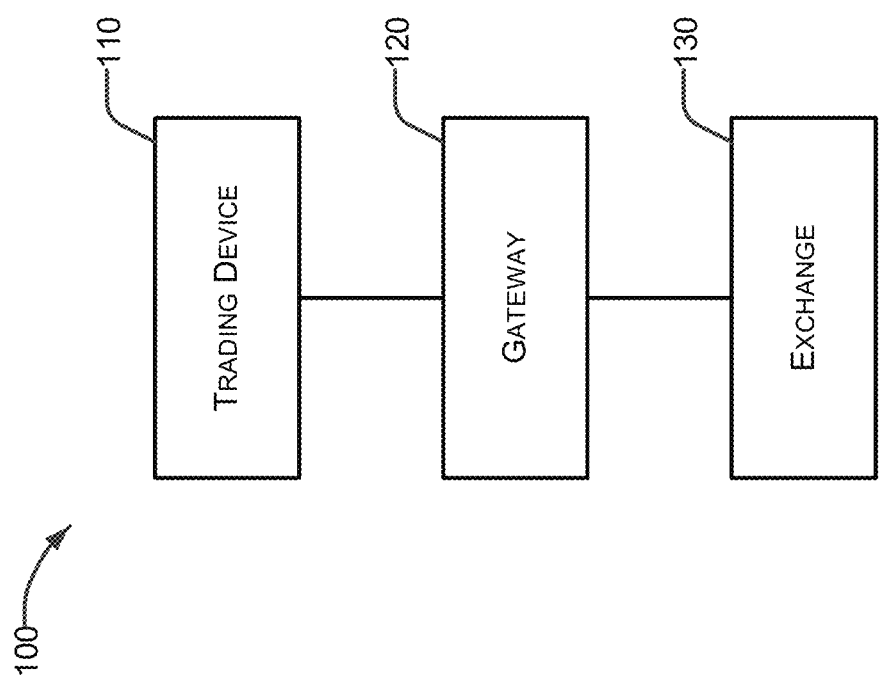
FIG. 1 illustrates a block diagram representative of an example electronic trading system in which certain embodiments may be employed.

The embodiments described herein will be better understood when read in conjunction with the provided figures, which illustrate examples. It should be understood, however, that the embodiments are not limited to the arrangements and instrumentality shown in the attached figures.

DETAILED DESCRIPTION

Embodiments described herein are directed to methods, systems, and devices for determining and/or displaying visual representations of a user interface displayed at a computing device. A visual representation may be determined and/or displayed at a computing device, as described herein. The visual representation may be displayed to indicate a display configuration for a user interface of an application that may be run on other computing devices. The visual representation may be displayed to indicate user interactions with the user interface of the application that may be run on other computing devices. The application may be a trading application that may include a configurable user interface. The visual representation may reflect the changes to the configurable user interface. The user interface may include different trading application windows. Each trading application window may include different market data, personal trading information, and/or functions for interacting with the trading application.

The visual representation of the user interface may be determined based on user interface information, which may be logged at the computing device on which the application may be run. The user interface information may include display configuration information that may indicate a display configuration for the user interface. The display configuration information may indicate a location and/or size of application windows or functions displayed in the user interface, for example. The visual representation may be determined and displayed to indicate the location and/or size of the application windows or functions displayed in the user interface.

The user interface information may include user interaction information that may indicate user interactions with the user interface. The user interaction information may indicate a position of the user interaction and/or a number of user interactions at a position or within an area of the user interface. The visual representation may use the user interaction information to indicate the more frequently used portions of the user interface and/or the less frequently used portions of the user interface.

Different levels of information may be displayed in the visual representation. The levels of information may be based on different permission levels granted by a user of the application. For example, a user of a trading application may wish to select a permission level that prevents access to and/or display of market data and/or personal financial information that may be displayed at the user interface of a trading application.

The visual representation of the user interface may include data obtained from a remote data source. The remote data source may be shared with the computing device on which the user interface may be displayed. The remote data source may include an electronic exchange, for example, from which a trading device may receive market data that may be displayed on the user interface. The remote data source may be indicated in the user interface information. The visual representation may be include the display configuration of the user interface and the data received from the remote data source. The display configuration information and the data may be received over separate networks or from separate sources, which may reduce the demand on a given network.

Although this description discloses embodiments including, among other components, software executed on hardware, the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Systems, methods, and apparatus are described herein for displaying visual representations. As described herein, a computing device may receive user interface information associated with an application on a second computing device. The user interface information may include display configuration information that indicates a display configuration of a user interface on the second computing device. The user interface information may include user interaction information that indicates a user interaction with the user interface on the second computing device. The user interface information may indicate a remote data source from which data may be displayed in the user interface on the second computing device. The computing device may receive the data from the remote data source indicated in the user interface information. The computing device may generate, based on the user interface information and the data from the remote data source, a visual representation that indicates the display configuration of the user interface and/or the user interaction with the user interface on the second computing device. The computing device may display the visual representation on the display.

The display configuration information may indicate a size of an application window associated with the user interface on the second computing device. The visual representation may include a window object that corresponds in size to the size of the application window.

The display configuration information may indicate a position of an application window associated with the user interface on the second computing device. The visual representation may include a window object that corresponds in position to the position of the application window.

The display configuration information may indicate a number of application windows activated by a user of the application on the second computing device over a period of time. The visual representation on the display may identify the number of application windows activated by the user over the period of time.

The user interaction information may indicate a position of a user selection and/or a number of user selections associated with user interface on the second computing device over a period of time. The visual representation may indicate the position of the user selection and/or the number of user selections over the period of time.

The visual representation may indicate a plurality of user selections within a predetermined distance from each other using a single indicium.

The computing device may receive user interface information associated with a third computing device and may determine the visual representation based on the user interface information associated with the third computing device.

The computing device may provide a user profile that is based on the user interface information. The user profile may indicate a predefined display configuration for the application.

The second computing device may be a financial trading device. The application may be a financial trading application. The visual representation may omit market data or personal financial data used by the financial trading application on the financial trading device.

The computing device may identify, based on the user interaction information, at least one portion of the user interface that is used more frequently than other portions of the user interface. The computing device may determine, based on the identified portion or portions of the user interface, an application update for the application that modifies the display configuration of the user interface. The computing device may send the application update to the second computing device.

The visual representation may include a real-time representation of the user interface associated with the application on the second computing device.

The computing device may query a data store for the user interface information. The computing device may receive the user interface information in response to the query.

The computing device may receive, from the second computing device, a permission level that indicates a level of information available in the data store. The computing device may query the data store for the user interface information based on the permission level.

A server may aggregate user interface information associated with a trading application from a plurality of trading terminals. The aggregated information may be received at the server in response to a request, in a consistent stream of information (e.g., such as when a change has occurred at the trading application), at predefined intervals of time, and/or the like. A computing device may query the aggregated user interface information to obtain the user interface information associated with a trading terminal of the plurality of trading terminals. The user interface information associated with the trading terminal may include display configuration information that indicates a display configuration of a user interface on the trading terminal. The user interface information associated with the trading terminal may include user interaction information that indicates a user interaction with the user interface on the trading terminal. The user interface information may indicate a remote data source from which data is displayed in the user interface on the trading terminal. The computing device may receive the data from the remote data source indicated in the user interface information. The computing device may determine, based on the user interface information associated with the trading terminal and the data received from the remote data source, a visual representation that indicates the display configuration of the user interface on the trading terminal and/or the user interaction with the user interface on the trading terminal.

The computing device may display the visual representation.

The display configuration information may indicate a size of an application window associated with the user interface on the trading terminal. The visual representation may include a window object that corresponds in size to the size of the application window.

The display configuration information may indicate a position of an application window associated with the user interface on the trading terminal. The visual representation may include a window object that corresponds in position to the position of the application window.

The user interaction information may indicate a position of a user selection and/or a number of user selections associated with the user interface on the trading terminal over a period of time. The visual representation may indicate the position of the user selection and/or the number of user selections over the period of time.

The visual representation may omit at least one of market data or personal financial data used by the trading application at the trading terminal.

A computing device may receive display configuration information that indicates a display configuration of a trading application window displayed on a second computing device. The display configuration information may indicate a remote data source from which data may be displayed in the trading application window. The computing device may receive the data from the remote data source specified in the display configuration information. The computing device may generate a visual representation of the trading application window. The visual representation of the trading application window may be generated based on the display configuration information and the data from the remote data source. The computing device may display, via a display, the visual representation of the trading application window. The visual representation may include the display configuration of the trading application window displayed on the second computing device and the data from the remote data source.

The data may be received from the remote data source via a data feed that is shared with the second computing device.

The data feed may be provided via a gateway.

The data feed may be representative of trading activity in a market operating at an electronic exchange.

The remote data source may include an electronic exchange. The visual representation may display the same market data from the electronic exchange as the trading application window.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
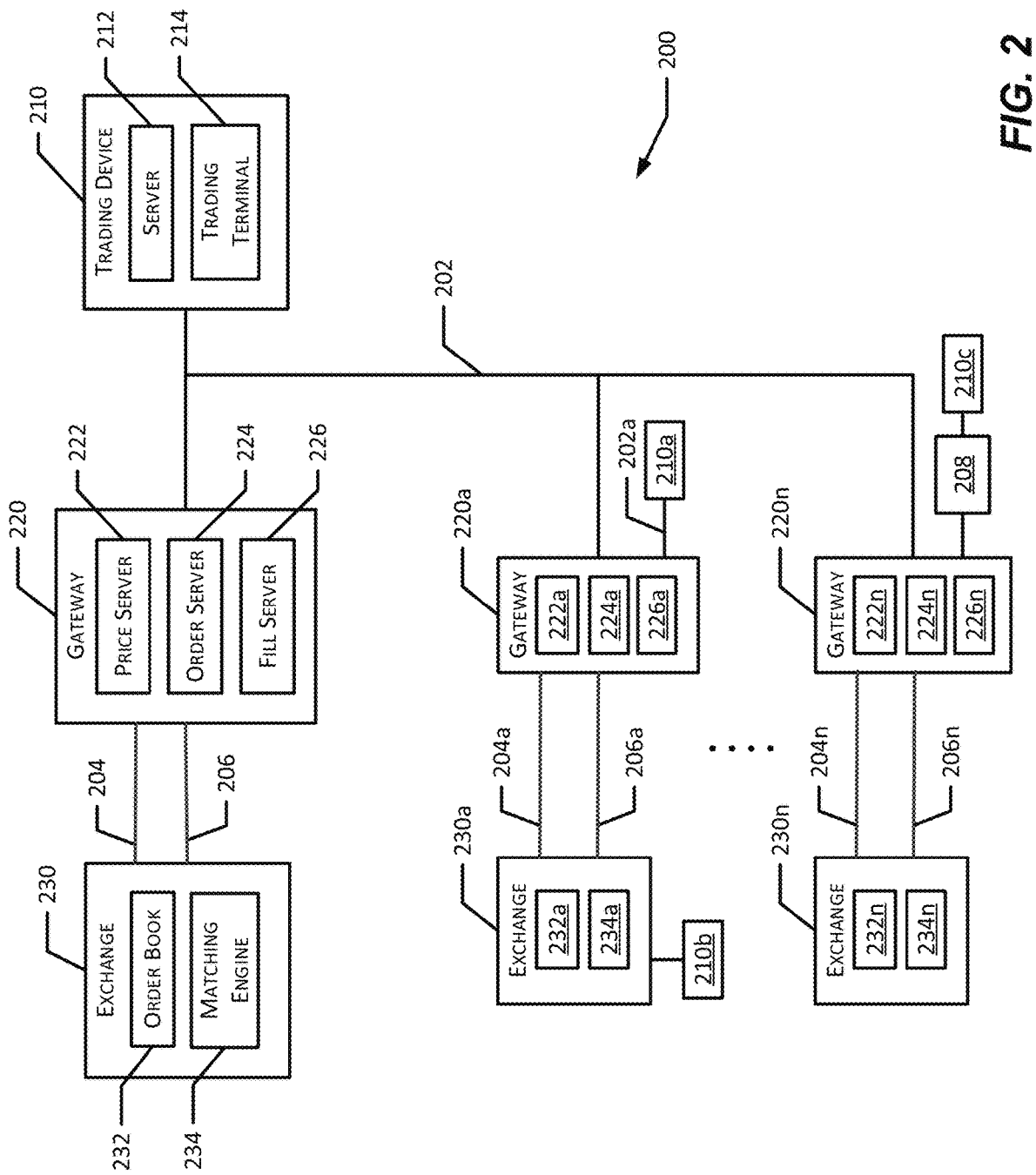
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
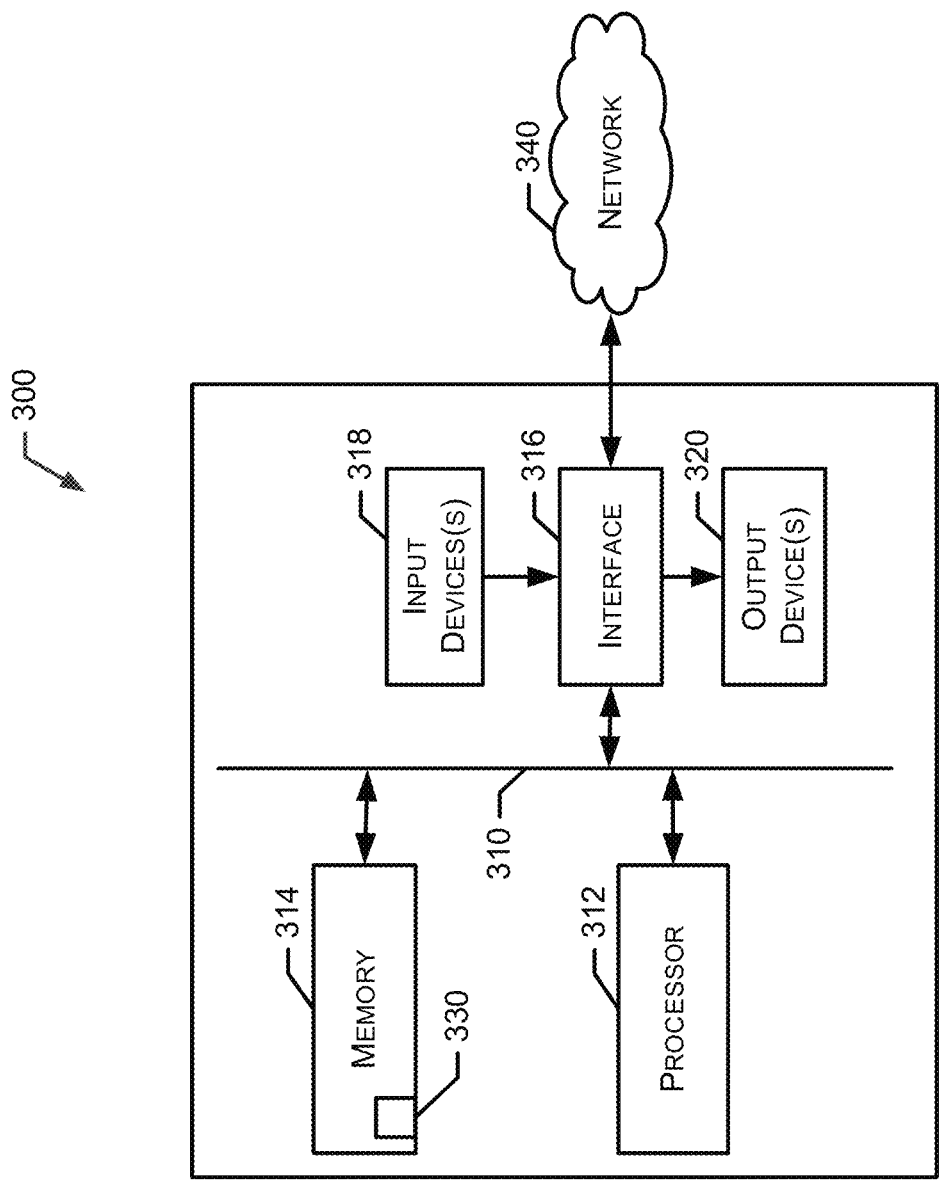
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Visual Representations of a User Interface

Figure 4:
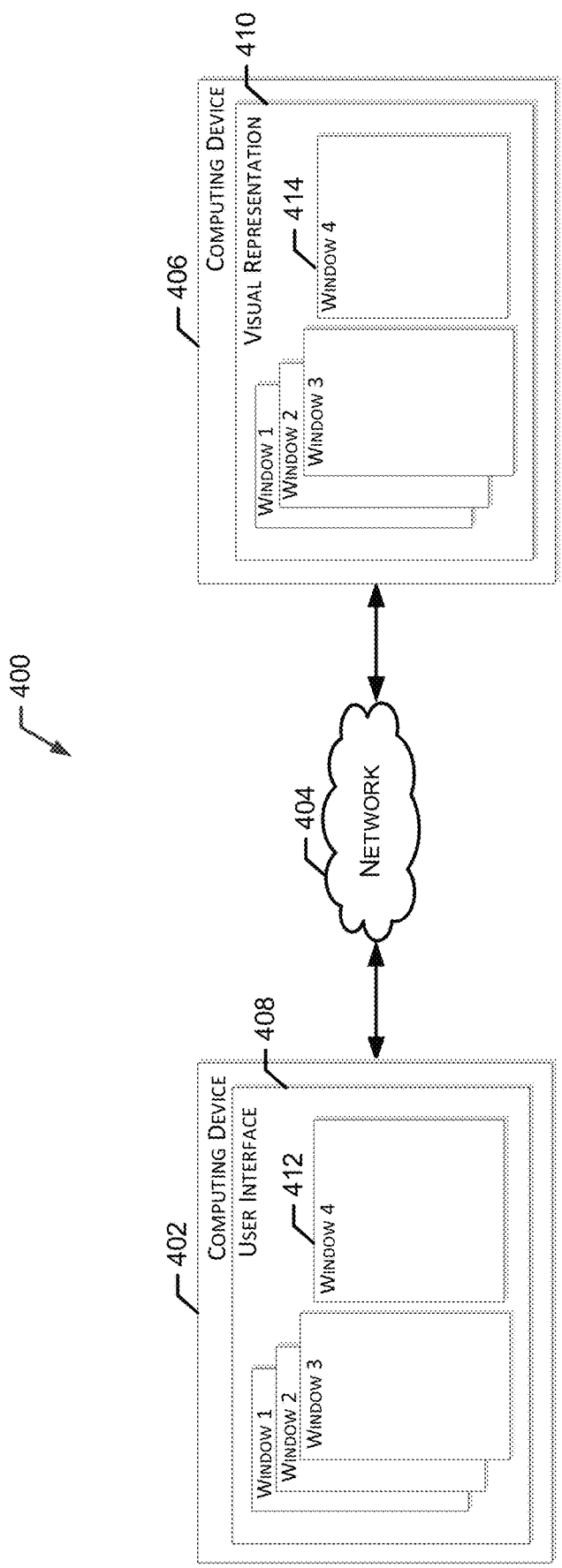
FIG. 4 illustrates a block diagram of an example system which may be implemented to display a visual representation of a user interface at a computing device.

FIG. 4 illustrates an example system 400 for displaying a visual representation of a user interface at a computing device. The system 400 may include a computing device 402 and a computing device 406 that may communicate with each other directly or via the network 404. The computing device 402 may be a trading device, such as trading device 210, or a portion thereof, such as the trading terminal 214 or the server 212, for example. In another example, the server 212 may be included in the network 404. The computing device 406 may be a trading device or another computing device that may communicate with the computing device 402 to access information.

The computing device 402 may run one or more applications that may provide a user interface 408 for displaying information to and/or receiving information from a user. The user interface 408 may be configurable. The user interface 408 may include one or more configurable windows 412. The windows 412 may be trading application windows that may display market data via the user interface 408. The number of windows 412, the size of the windows 412, and/or the position of the windows 412 may be configurable by a user. For example, the position of the window 412 may be specified by Cartesian coordinates corresponding to the upper left hand corner of the window, and the size of the window may be specified relative to those coordinates. The information in the windows 412 may be configurable. For example, the windows 412 may include data from a remote source, buttons, or other functions, the size and/or position of which may be configurable by the user. The windows 412 may further include any user-specified or configurable options such as a default price, a default quantity as well as any interface or application settings. The example user-specified settings associated with the window 412 provide a means and information by which the user interface 408 can be reconstituted and/or reconstructed at a remote location.

User interface information that indicates a display configuration of the user interface 408 and/or user interactions with the user interface 408 may be logged and/or stored at the computing device 402. The user interface information may be transmitted to the computing device 406. The computing device 406 may provide a visual representation 410 based on the user interface information that indicates the display configuration of the user interface 408 and/or user interactions with the user interface 408. For example, the computing device 406 may utilize the size and location of the windows 412 at the user interface 408 from the user interface information and may generate windows 414 in the visual representation 410, which may indicate the size and location of the windows 412. While the size and location of the windows 412 in the user interface 408 are provided as example types of information that may be logged at the computing device 402 and/or indicated at the computing device 406, other types of information are also described herein. In particular, the user configurable data describing the arrangement and/or set-up of the user interface 408 and/or the window 412 may be provided or accessed by the computing device 406 in order to reconstruct the configuration into the visual representation 410. The visual representation 410 may be used to determine a display configuration of the user interface at the computing device 402 or to troubleshoot problems at the computing device 402. The problems may be detected based on the visual representation 410. The visual representation 410 may be shared with other computing devices, such as the computing device 402, via the network 404.

Figure 5:
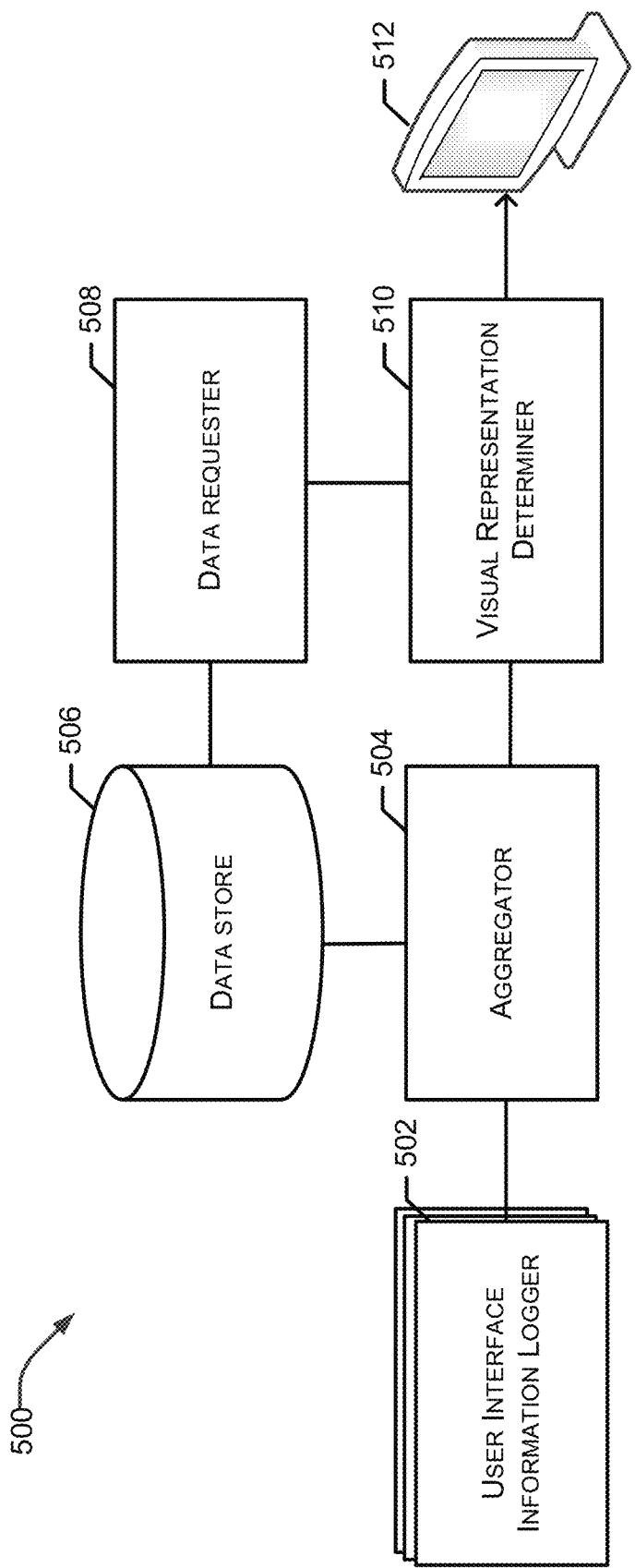
FIG. 5 illustrates a block diagram of an example system which may be employed with disclosed embodiments.

FIG. 5 illustrates an example system 500 for displaying a visual representation of a user interface at a computing device. The system 500 may be used to display a visual representation of the user interface displayed at the trading device 210, for example. The system 500 may include user interface (UI) information loggers 502, an aggregator 504, a data store 506, a data requester 508, a visual representation determiner 510, and/or a display 512. One or more portions of the system 500 may be implemented as hardware and/or software at a computing device. The portions of the system 500 that reside in software may be stored in memory and/or executed by the processor of one or more computing devices. For example, the UI information logger 502, the aggregator 504 and/or the data store 506 may be implemented at the trading terminal 214 and/or the server 212 to gather and store user interface information that may be displayed at the trading terminal 214. The data requestor 508, the visual representation determiner 510, and/or the display 512 may be implemented by the server 212 and/or another computing device, such as the computing device 406 shown in FIG. 4 for example, to determine and/or display a visual representation of the user interface displayed at the trading terminal 214.

The UI information logger 502 may log user interface information for an application that may be running at a computing device, such as the trading device 210, for example. The user interface information may include display configuration information that indicates a display configuration of the user interface of the application running on the computing device. The user interface information may include user interaction information that indicates user interactions with the user interface of the application running on the computing device. The display configuration information may include a user profile for the display configuration, the number of application windows displayed in the user interface, the size of application windows displayed in the user interface, the position of application windows displayed in the user interface, the title of application windows displayed in the user interface, the number of application functions displayed in an application window for controlling the functionality of the application, the position of the application functions displayed in an application window, the size of the application functions displayed in an application window, the name of the application functions displayed in an application window, and/or the like. An application function may be a button, a text box, or other controllable object on the user interface that may allow a user to interact with the application. The UI information logger 502 may record a time at which the user interface information is logged.

Different display configurations for the user interface may be provided by the application for different user profiles. The user interfaces for different user profiles may display different application windows, application window sizes, application window positions, application functions, positions of application functions, sizes of the application functions, and/or the like. When a user selects a user profile at a computing device, the user may be presented with a predefined display configuration for the user interface. The user may choose to modify the display configuration and the UI information logger 502 may log the user interface information that indicates the modified display configuration. The user interface information may be used to create and/or modify the user profiles, as further described herein.

The UI information logger 502 may log user interactions with an application via the user interface. The UI information logger 502 may log a position of the user interaction and/or a number of user interactions at a position or within an area of the user interface. The UI information logger 502 may log user interface information that indicates the more frequently used application functions, the less frequently used application functions, and/or application functions that are not used. The UI information logger 502 may log the user interface information in a UI information log. The UI information log may be stored in memory.

The UI information logger 502 may log the user interface information periodically. For example, the user interface information may be logged once a week, once a day, once an hour, once a minute, and/or the like. The periodicity of the logging of the information at the UI information logger may be configurable, for example, by a user of the computing device logging the user interface information. The UI information logger 502 may log the user interface information upon receiving a user interaction with the user interface. For example, the UI information logger 502 may log the user interface information upon determining a modification of the display configuration or a user selection, such as a change in the number of application windows being displayed, a change in the size of an application window, a change in the position of an application window, a selection of an application function, a change in the position of an application function, a change in the size of an application function, and/or another type of user interaction with the user interface. The UI information logger 502 may log the user interface information upon receiving a request from a computing device, such as a request from the computing device 402, the computing device 406, or another computing device.

The user interface information from one or more computing devices may be sent to the aggregator 504. For example, the trading devices 210, 210a, 210b, and/or 210c may send logged user interface information to the aggregator 504. The aggregator 504 may receive the aggregated information in response to a request from the trading devices, in a consistent stream of information (e.g., such as when a change has occurred to the user interface at the trading devices), at predefined intervals of time, and/or the like. The aggregator 504 may aggregate the user interface information for each trading device 210, 210a, 210b, 210c, such that similar types of user interface information may be logged from different devices and/or from different times. The aggregator 504 may be implemented using proprietary software, such as SPLUNK® data analytics software, for example. The aggregator 504 may store the aggregated user interface information in the data store 506.

The data store 506 may include a relational database, an extensible markup language (XML) database, or another type of database. The data store 506 may receive a request for information and return information in response to the request. The request may be in the form of a query, such as a structured query language (SQL) query, for example. The data store 506 may encrypt the stored user interface information. The data store 506 may include cloud storage that may be distributed over one or more computing devices.

The data requester 508 may request information from the data store 506. The data requester 508 may request user interface information associated with a particular computing device and/or a particular session in which the computing device was running the application. For example, the data requestor 508 may use a computing device identifier and/or a session identifier to request the user interface information, or portions thereof, for the identified computing device and/or during the identified session during which the application is run.

The visual representation determiner 510 may use the user interface information to generate a visual representation of one or more portions of the user interface for the application that may be run on a computing device, such as the trading device 210, for example. The visual representation may indicate a display configuration associated with an application on the other computing device. The visual representation may indicate one or more user interactions associated with an application on the other computing device. For example, the visual representation may indicate user interactions with the user interface for a trading application on the trading device 210. The visual representation determiner 510 may receive the user interface information from the data store 506 via the data requestor 508 or directly from the aggregator 504. In certain embodiments, the visual representation determiner 510 can receive an aggregated set of user interface information depicting and/or detailing the changes in the user information over a period of time. For example, a set of aggregated user information can be communicated to the computing device 406 allowing for a replay of the aggregated information at the computing device 406. In this way, a user may replay and see any changes and/or activity occurring at the user interface 408 and/or the window 412 during the aggregation period.

The visual representation determiner 510 may determine a visual representation that identifies a display configuration and/or user interactions with the user interface for the application running at a computer device. The visual representation may include one or more window objects that may correspond with an application window displayed on the user interface for the trading application on the trading device 210. The window object may be rectangular in shape and may have an object size that is proportional to the size of the corresponding trading application window at the trading device 210. For example, a height-to-width ratio of the window object may be the same as a height-to-width ratio of the corresponding trading application window. Within the visual representation, the window object may positioned at a position that corresponds with the position of the corresponding trading application window on the trading device 210. For example, the rectangular object may be positioned in the center when the corresponding trading application window is positioned in the center of the user interface at the trading device 210. The size, shape, and/or position of the window object may be determined based on the user interface information logged by the UI information logger 502.

The visual representation determiner 510 may include text in the visual representation. The text may include a title of the corresponding application window, a title of functions in the application window, and/or data, e.g., market data, that may be displayed in the application window. The visual representation determiner 510 may position the text at a position, within the visual representation, that corresponds with a position of the text in the corresponding application window of the user interface. For example, the visual representation determiner 510 may position the title of an application window in the top left corner of the window object when the title is positioned in the top left corner of the application window of the user interface. The size, position, and/or font type of the text may be determined based on the user interface information logged by the UI information logger 502.

The visual representation determiner 510 may include indicia in the visual representation to indicate user interactions with the user interface on a computing device. For example, the visual representation determiner 510 may include indicia in the visual representation to indicate user interaction with the trading application running on the trading device 210. The visual representation determiner 510 may position the indicia, within the visual representation, at a position that corresponds with a position of a user interaction with the user interface at the trading device 210.

The visual representation determiner 510 may represent multiple user interactions within a predefined area using a single indicium. For example, the indicium may increase in size based on the number of user interactions with the user interface at a corresponding position or within a corresponding area of the user interface on the trading device 210. For example, indicia that represents two user selections within a predefined area of one another may be twice the size of indicia that represents a single user selection within the same predefined area. The indicia may also, or alternatively, represent user selections within a predefined position in the visual display. For example, the indicia may indicate user-selections in different quarters of the visual display.

The visual representation determiner 510 may include different indicia to indicate user interactions on different computing devices and/or different sessions for running the application. For example, different indicia may be used to identify user interactions at trading device 210 and trading device 210a shown in FIG. 2. Different indicia may also, or alternatively, be used to identify user interactions during different sessions the trading application may be run at trading device 210. The size, shape, and/or position of each indicium of user interaction with the user interface may be determined based on the user interface information logged by the UI information logger 502.

The computing device from which the user interface information is logged and the computing device on which the visual representation is being determined may each access data from a common source. For example, the computing device on which the visual representation determiner 510 resides may be subscribed to receive market data from the same exchanges as the trading device from which the user interface information is logged to create the visual representation. The visual representation determiner 510 may include market data from an exchange in the visual representation so that the visual representation resembles or mirrors the user interface associated with the trading application at the trading device. The visual representation determiner 510 having independent access to the same exchanges as the trading devices may allow the visual representation determiner to generate a visual representation of the user interface at the trading devices, including the market data being displayed, based on the user interface information for each trading device and the market data received from the exchange.

The visual representation determiner 510 may create a direct representation of the user interface on another computing device. The visual representation determiner 510 may access locally stored information that may indicate a predefined display configuration for the user interface that may be executed by an application at the other computing device. For example, the locally stored information may indicate the types of windows and/or functions that may be displayed in the user interface, the locations of the windows and/or functions, etc. The visual representation determiner 510 may use the user interface information to identify the display configuration of the user interface at the other computing device, such as changes in window and/or function locations, changes in window and/or function size, etc. The visual representation determiner 510 may use the data from the common data source to represent the data displayed at the other computing device. The visual representation may directly represent the user interface at a moment in time or in real-time.

The visual representation may be determined for an instant in time or over a period of time. The visual representation may be a real-time representation of the user interface on the trading device, which may allow the visual representation determiner 510 to generate a real-time visual representation of the user interface at trading devices without receiving a video feed of the user interface at the trading devices. The visual representation may be created for different times in which the user interface was displayed. For example, the visual representation may be created for a time in which the user did not recognize a problem with the application displaying the user interface and a time in which the user recognized a problem with the application displaying the user interface to compare the display configuration at two different times to determine a problem that may have occurred with the application.

The visual representation may be displayed on the display 512. The display 512 may be an example of an output device for a computing device. The display 512 may receive the visual representation from the visual representation determiner 510 and may display the visual representation. The display 512 may display the visual representation in response to a request, such as a request from a user of a computing device, for example.

Figure 6:
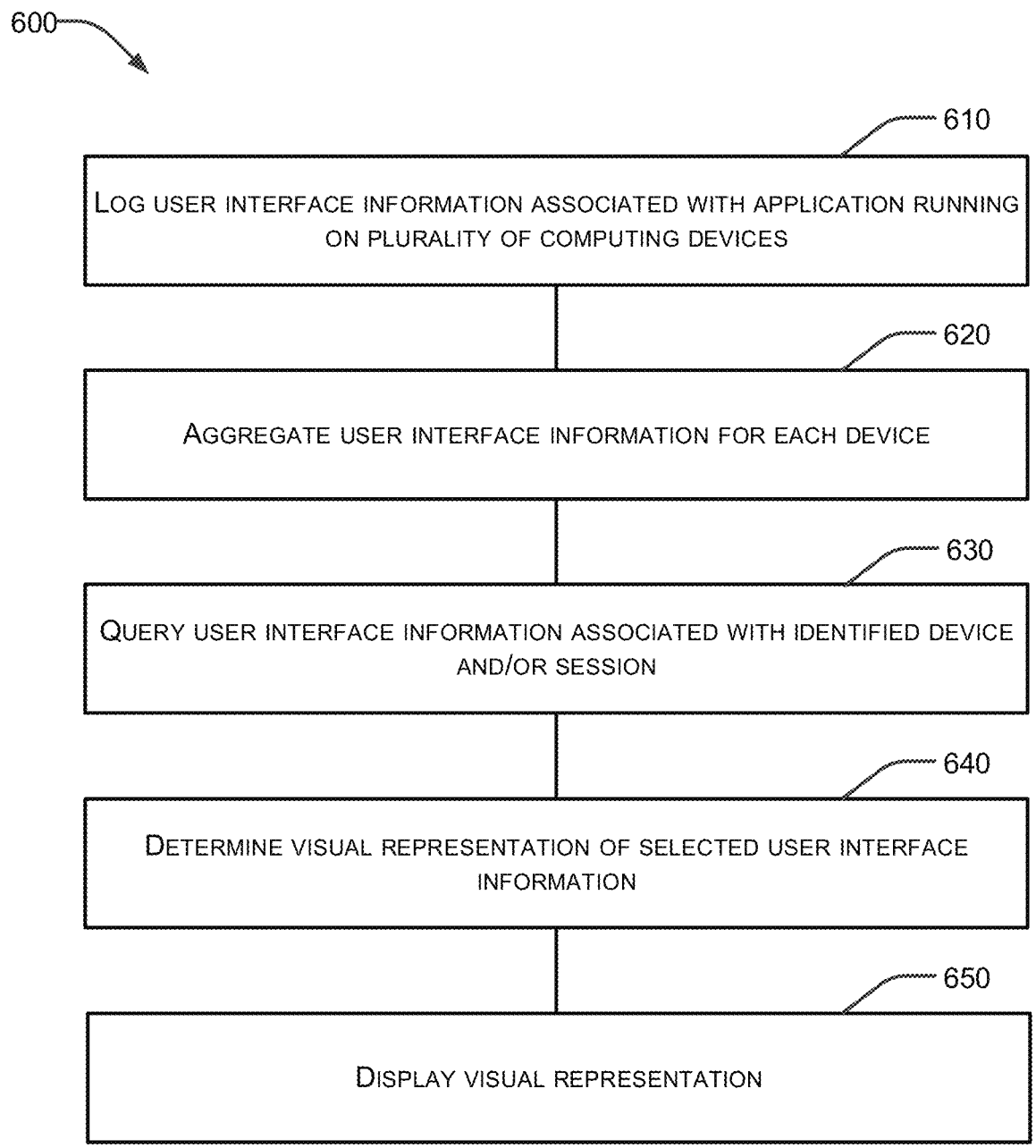
FIG. 6 illustrates an example method for displaying visual representations of user interfaces at computing devices.

FIG. 6 illustrates a method 600 that may be used to display visual representations of user interfaces at computing devices. At 610, user interface information may be logged for an application running on computing devices. For example, each trading device may log the user interface information for the trading application running on the trading device. At 620, the user interface information from each of the computing devices may be aggregated. Aggregation may occur locally at, for example, the computing device 402. Alternatively, the user interface information may be communicated to, for example, a SPLUNK® server or other aggregation repository. The user interface information may be communicated as part of a batch process, in response to a detected change at the computing device, and/or in response to a request for an update. The aggregated information may be logged upon a change in the user interface and/or upon request. The aggregated user interface information may be stored in a searchable format that may allow for retrieval of the user interface information for a computing device or session of the computing device in which the application is run.

At 630, the aggregated user interface information may be queried to obtain the user interface information for an identified computing device and/or session in which application was run. The query may include one or more computing device identifier and/or session identifier. The query response may provide the user interface information for the identified computing device and/or session. Each query may include one or more computing device identifiers and/or session identifiers. The query may include identified user interface information, such as certain display configuration information and/or user interaction information, and the query response may include the identified user interface information. The query may include an identified time at which the user interface information was logged and the query response may provide the user interface information for the identified time.

A visual representation of the selected user interface information may be determined at 640 and the visual representation may be displayed at 650. The visual representation may be determined based on the user interface information from a computing device and/or information from a data source that is shared with the computing device. For example, the computing device on which the visual representation is determined may be subscribed to receive market data from the same exchanges as the trading device from which the user interface information is logged to create the visual representation.

The method 600 may be used to determine and/or display a visual representation of the user interface at a computing device at an instant in time or over a period of time. The visual representation may be determined and/or displayed based on a query that may retrieve user interface information at an instant in time. At 630, the aggregated user interface information may continue to be queried to receive updated user interface information, or the user interface information may be pushed to the computing device when a change or user interaction occurs. The query, at 630, may also, or alternatively, indicate a period of time for sending user interface information to the computing device for determining the visual representation, at 640. The user interface information received over the period of time may be used to determine and/or display a visual representation of the user interface over the period of time. For example, the query may retrieve real-time user interface information for determining and/or displaying a real-time visual representation of the user interface. As the user interface information and/or information from a common data source, such as market data for example, may be received by the computing device over a period of time, the visual representation determined and displayed by the computing device may appear to be a video of the user interface without the higher data rates that may be associated with transmitting video data.

Figure 7:
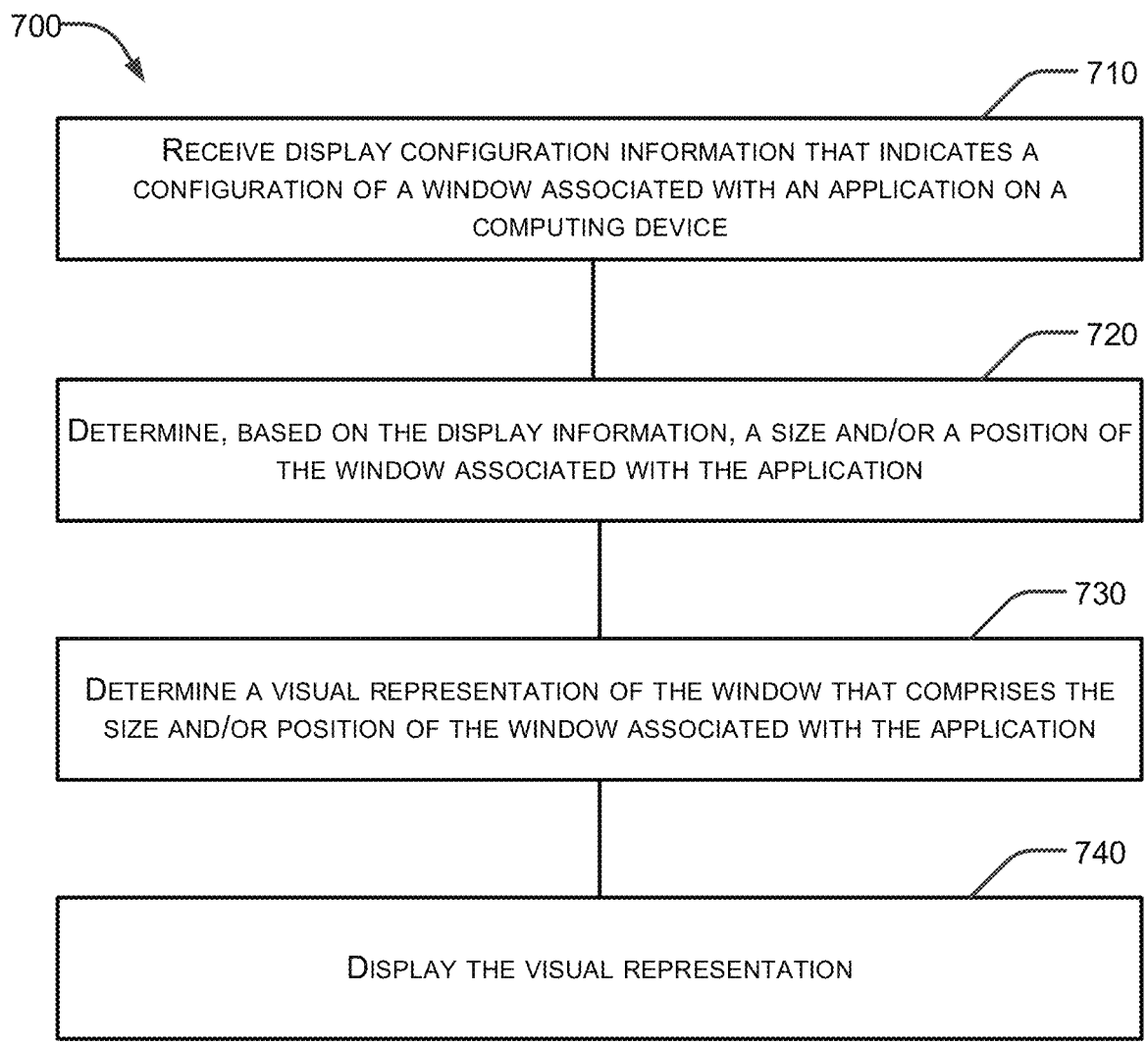
FIG. 7 illustrates an example method for displaying visual representations of display configurations of user interfaces at computing devices.

FIG. 7 illustrates a method 700 that may be used to display visual representations that include display configurations of user interfaces at computing devices. At 710, display configuration information may be received at a computing device. The display configuration information may be received in response to a query that requests the display configuration information. The display configuration information may indicate a configuration of one or more application windows displayed in a user interface on another computing device. For example, the display configuration information may indicate a configuration of trading windows for a trading application on a trading device. The display configuration information may include a size, a position, and/or identifier of each application window in the user interface.

At 720, a size and/or a position of the application windows may be determined based on the display configuration information. A visual representation of the application windows may be determined at 730. The visual representation may identify the size and/or the position of the application windows displayed on the user interface at the other computing device. For example, the visual representation may include a rectangle for each application window at the user interface that has a size and position that is proportional to the size and position of the corresponding application window in the user interface. The visual representation may be displayed at 740 to indicate the size and/or position of the application windows displayed at the user interface. The visual representation displayed at 740 may indicate a display configuration for the user interface without showing data being displayed in the user interface, such as market data or personal financial data, for example. The market data or personal financial data may be omitted from the visual display to protect a user's privacy.

Figure 8:
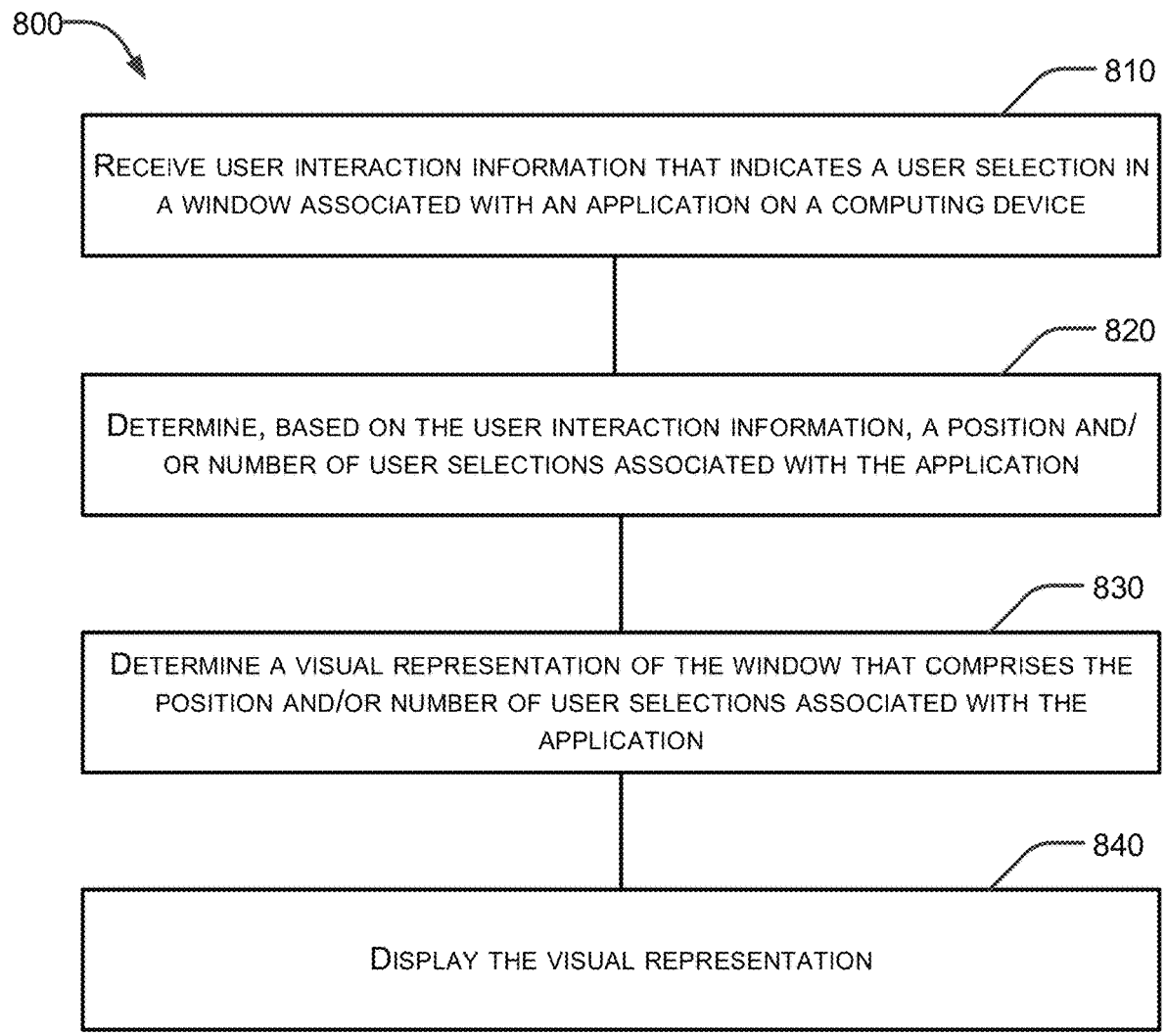
FIG. 8 illustrates an example method for displaying visual representations of user interactions with user interfaces at computing devices.

FIG. 8 illustrates a method 800 that may be used to display visual representations of user interactions with a user interface at computing devices. At 810, user interaction information may be received at a computing device. The user interaction information may indicate a user selection or other interaction with the application via the user interface at another computing device. For example, the user interaction information may indicate a user selection or other interaction with the application via the user interface at another computing device. For example, the user interaction information may indicate a user selection of a button in an application window, a user selection in a text box in an application window, a user selection of an application window, a user selection of a user profile, and/or any other user interaction with the user interface at another computing device. The user interaction information may also indicate user interactions in the user interface at different computing devices, for example, by associating a computing device identifier with the user interactions at each computing device. The user interaction information may be received in response to a query that requests the user interaction information. The user interaction information may indicate a position of user interactions. The number of interactions within a predefined area or distance from one another may also be indicated in the user interaction information, or may be otherwise determined from the position of each user interaction.

Based on the user interaction information, a position and/or a number of user interactions with the user interface at each computing device may be determined, at 820. Additional user interaction information related to the setup and/or configuration of the user interface 408 may be utilized by the method 800. At 830, a visual representation may be determined that indicates the user interactions within the user interface. The visual representation may indicate the position of a user interaction, for example, by displaying an indicia at a position in the visual representation that corresponds to the relative position of the user interaction within the user interface. The visual representation may indicate multiple user interactions within a predefined area using a single indicium. For example, when two user interactions with the user interface are determined to be within a predefined distance of one another or within a predefined area of the visual representation, the visual representation may indicate the user interactions with a single indicium. The indicium may increase in size based on the number of user interactions represented by the indicium. The visual representation may also, or alternatively, identify the actual number of user interactions represented by the indicium. The visual representation may include different indicia in the visual representation to indicate user interactions on different computing devices and/or during different sessions of the application. The visual representation may be displayed at 840.

Figure 9:
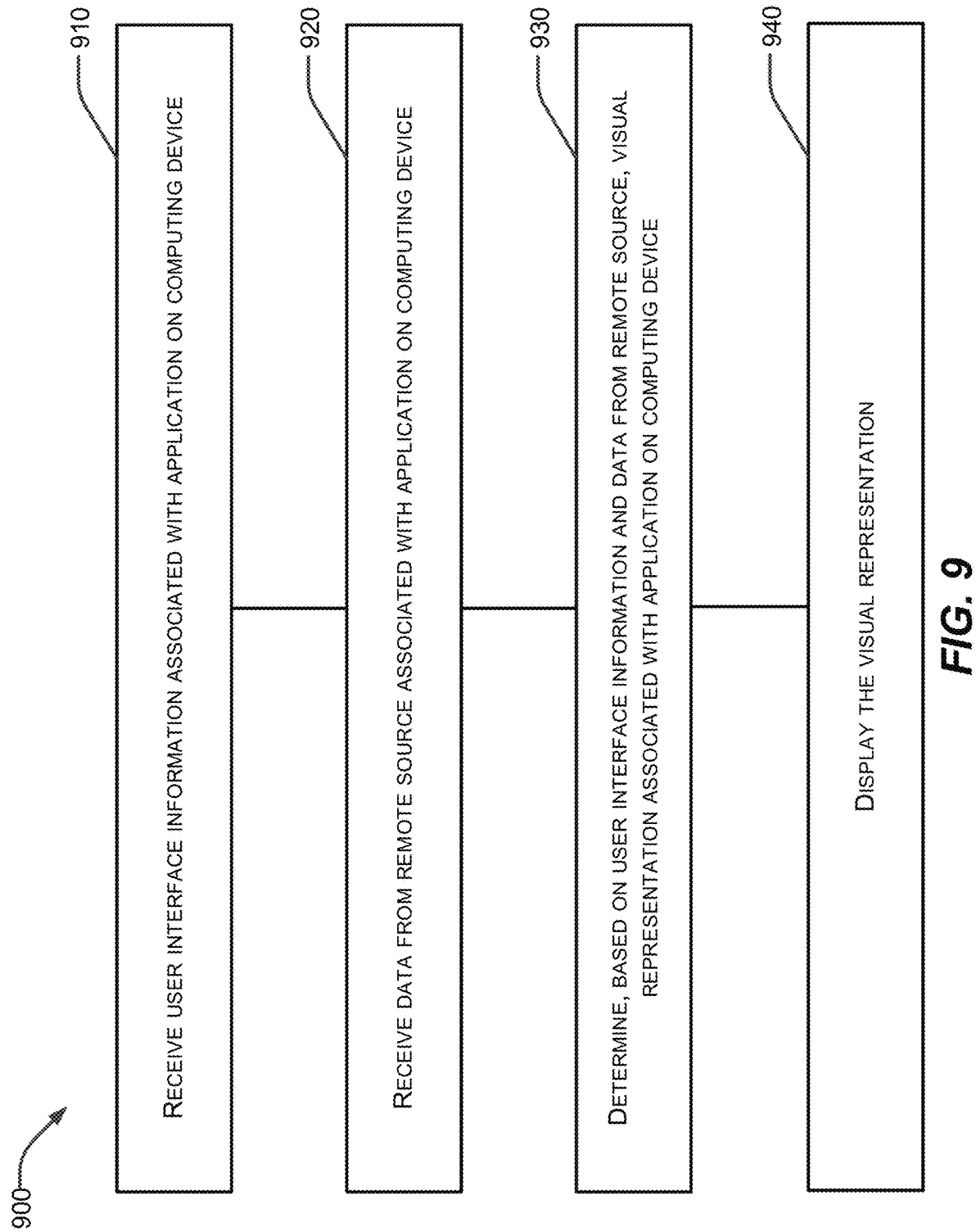
FIG. 9 illustrates an example method that may be used to display visual representations of user interfaces at computing devices.

FIG. 9 illustrates a method 900 that may be used to display visual representations of user interfaces at computing devices. At 910, user interface information may be received at a computing device. The user interface information may be received in response to a query, for example. The user interface information may include display configuration information and/or user interaction information for an application that may be run on another computing device. The display configuration information may identify a size, location, and/or font for displaying data within the user interface. At, 920, the computing device may receive the data from a remote source. The remote data source may be a common source with the computing device on which the user interface may be displayed.

The data received from the remote source may include market data from an exchange that may also be received at another computing device, such as a trading device, for example. The market data may be received via a common gateway that has the same data feed from the exchange. The market data on the data feed may be representative of trading activity in a market operating at the exchange.

The user interface information received at 910 may indicate the remote data source from which to receive the data at 920. For example, the display configuration information and/or the user interaction information may indicate the remote data source from which market data may be displayed in a trading application window. The user interface information may indicate an exchange and/or gateway from which the market data was received. The user interface information may indicate a type of market data displayed in the user interface, a time at which the market data was received or displayed in the user interface, and/or an application window in which the market data was displayed. The market data may be requested from the remote data source and may be received, at 920, in response to the request. The request may be sent to the exchange and/or gateway identified in the user interface information. The request may indicate the type of market data displayed in the user interface information and/or the market data from the time indicated in the user interface information.

The computing device may determine a visual representation based on the user interface information and the data from the remote data source, at 930. The visual representation may indicate a display configuration for the user interface. For example, the visual representation may indicate the number of application windows displayed in the user interface, the size of application windows displayed in the user interface, the position of application windows displayed in the user interface, the title of application windows displayed in the user interface, the number of application functions displayed in an application window for controlling the functionality of the application, the position of the application functions displayed in an application window, the size of the application functions displayed in an application window, the name of the application functions displayed in an application window, and/or the like. The visual representation may also include the data received from the remote source at 920. The size, location, and/or font type indicated in the user interface information for the data may be used to determine the size, location, and/or font type for the data in the visual representation. The visual representation may be displayed at 930.

Figure 10A:
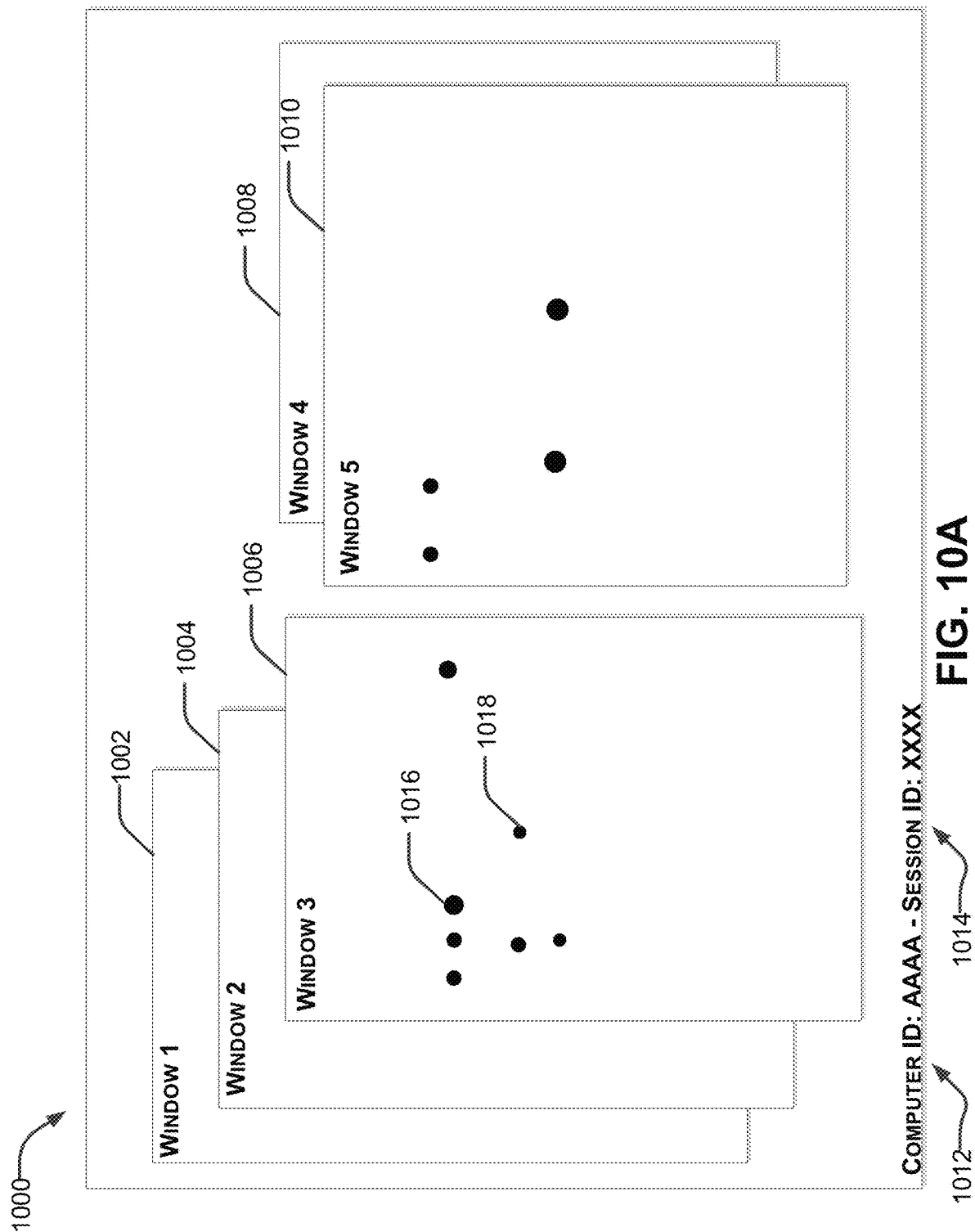
FIGS. 10A-10D depict example visual representations of user interfaces that may be displayed at a computing device.

FIGS. 10A-10D depict example visual representations of user interfaces that may be displayed at a computing device. FIG. 10A depicts an example visual representation 1000. The visual representation 1000 may include window objects 1002, 1004, 1006, 1008, 1010 that correspond with application windows displayed at a user interface of another computing device. The visual representation 1000 may include a computing device identifier 1012. The computing device identifier 1012 may identify a computing device from which the user interface information was logged. The visual representation 1000 may include a session identifier 1014. The session identifier 1014 may identify a particular session in which the user interface information was logged at the computing device. For example, the session identifier 1014 may identify a session that may have a time duration of one day, one hour, one minute, or the like.

The visual representation 1000 may indicate user interactions by displaying user interaction indicia 1016, 1018. A position of the user interaction indicia 1016, 1018 may correspond with a position of a user interaction within the user interface. The user interaction indicia 1016, 1018 may indicate the portions of the user interface that may be used more frequently. The visual representation 1000 may indicate an increased number of user interactions at a given position within the user interface by increasing the size of the user interaction indicia 1016, 1018 and/or providing the actual number of user interactions represented by the user interaction indicia 1016, 1018 (not shown).

As shown in FIG. 10A, the user interaction indicia 1016 may be greater in size than the user interaction indicium 1018, which may indicate that there were relatively more user interactions with the user interface where the user interaction indicium 1016 is positioned. The user interaction indicium 1016 may be a collective identifier for a plurality of user interactions within a predetermined distance from each other. For example, user interactions within a 10×10 pixels area may be represented by a collective identifier such as the user interaction indicia 1016. As illustrated, the visual representation 1000 may not expose any data that may be private or otherwise sensitive to the user, such as market data, personal financial information, or other personal user information, for example.

Figure 10B:
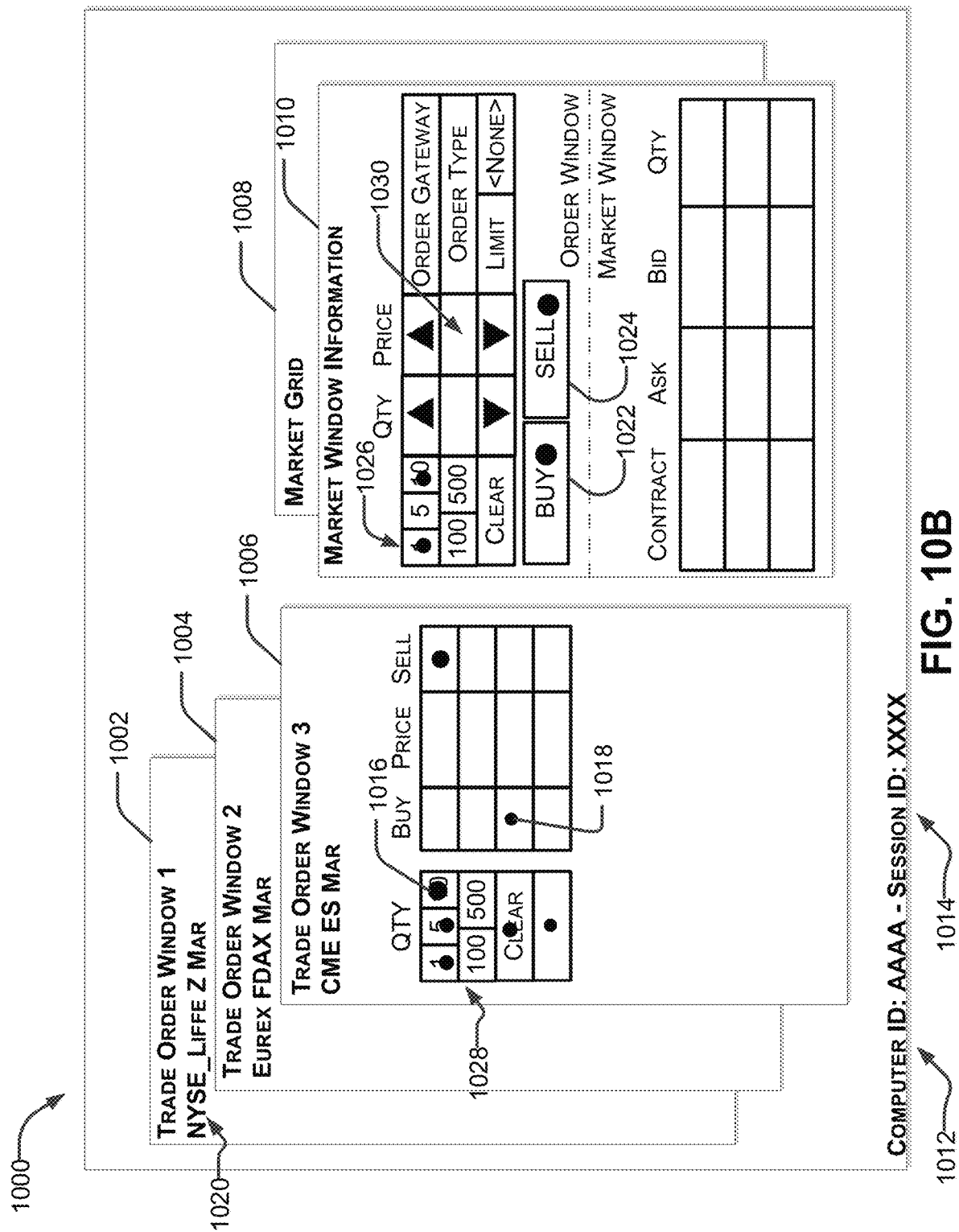

As illustrated in FIG. 10B, the visual representation 1000 may include additional, or alternative, information. The visual representation 1000 may include text 1022 in one or more application windows. The text may represent titles of application windows, such as titles of trading windows associated with a trading application, for example. The text may indicate market data, such as the name of an exchange. The text may identify other portions of the application windows.

The visual representation 1000 may indicate the position and/or size of functions that may allow a user to interact with the application. For example, the visual representation 1000 may indicate the location and/or size of a buy button 1022 to initiate a transaction to purchase a contract, a sell button 1024 to initiate a transaction to sell a contract, preset quantity buttons 1026, 1028 for selecting a trading quantity within a window, a text box 1030 for entering text or values in a window, and/or other functions that may be included in the user interface. As shown in FIG. 10B, the market data and/or personal trading information, such as the order information for example, may be prevented from being displayed in the visual representation 1000. The order information may include the order gateway, the order type, the price limit, the order price, the order quantity, the sell price, and/or the sell quantity for a transaction. The market data may include an ask price, a bid price, and/or an available quantity for a contract type.

Figure 10C:
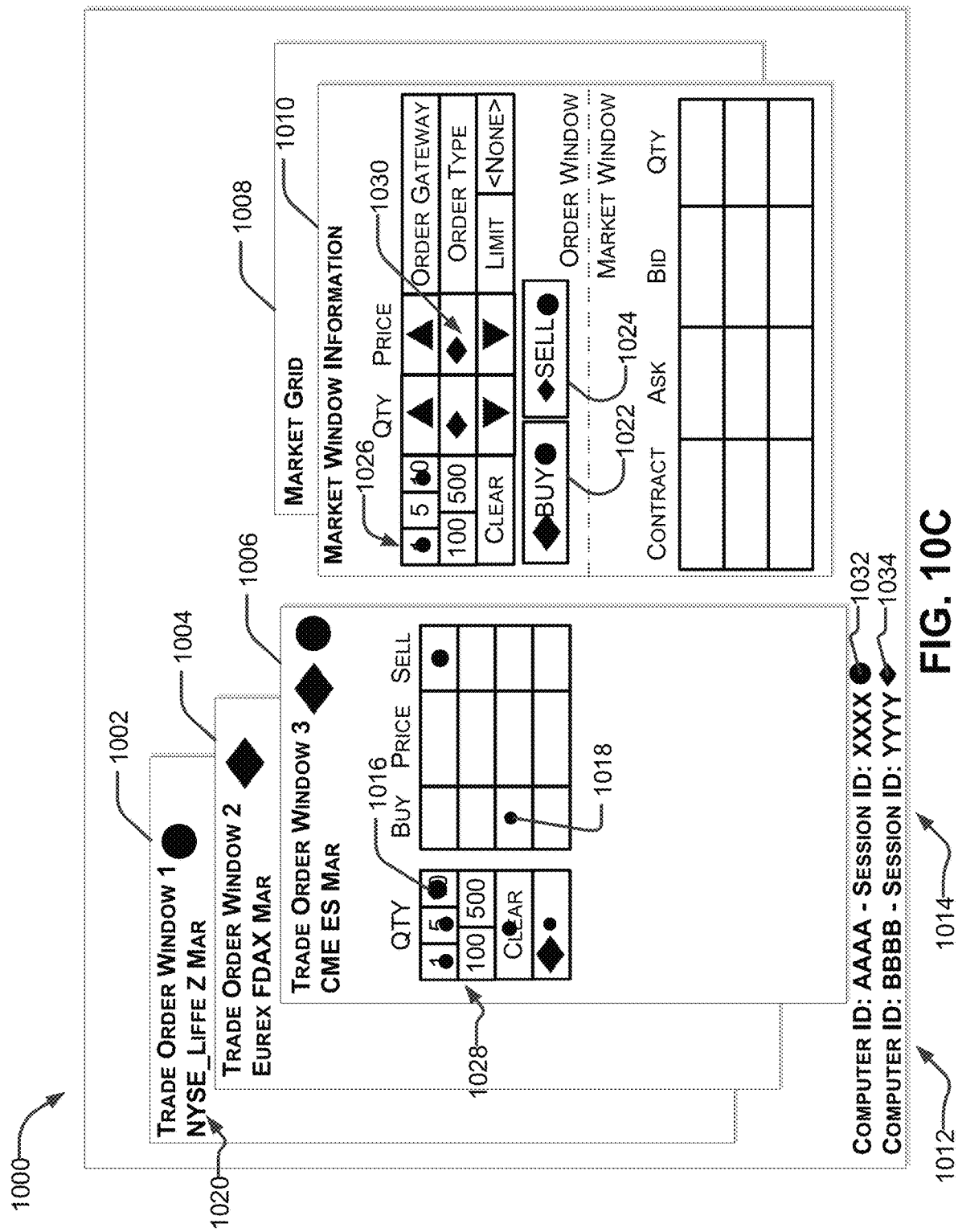

As depicted in FIG. 10C, the visual representation 1000 may display configuration information and/or user interaction information for more than one computing device and/or session. The visual representation 1000 may include different types of user interaction indicia 1032, 1034. The user interaction indicia 1038 and the user interaction indicia 1034 may indicate different computing devices and/or different sessions for running the application. The user interaction indicia may indicate different display configurations and/or user interactions at different computing devices, such as the application windows that may be displayed or used at a computing device, the configuration of the application windows that may be displayed or used at a computing device, the functions displayed or used at a computing device, and/or the like. The visual representation 1000 may include additional types of user interaction indicia to indicate user interactions associated with additional computing devices.

The different indicia for different computing devices may identify different portions of the user interface that may be used by different users. For example, the user interaction indicia 1034 in the visual representation 1000 indicates that the user of the computing device having the computing device identifier BBBB used the text boxes 1030 to enter quantity information in window 1010 during a session, while the user of the computing device having the computing device identifier AAAA used the preset quantity buttons 1026 to enter quantity information in window 1010 during a session.

Figure 10D:
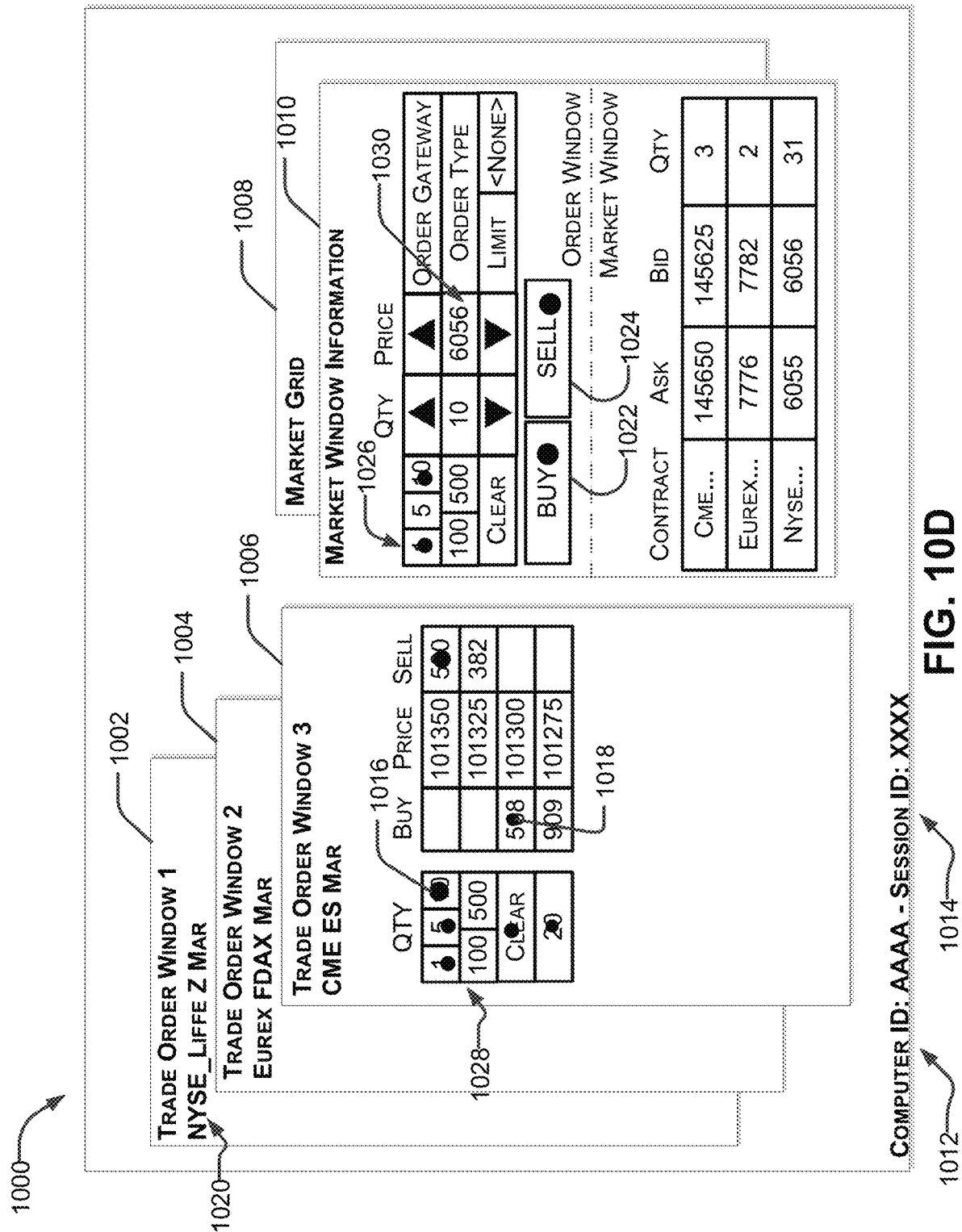

As illustrated in FIG. 10D, the visual representation 1000 may display market data 1040 and/or personal trading information, such as a user's order information for example. The market data may be received from an exchange. The visual representation 1000 depicted in FIG. 10D may be similar or identical to the user interface of a trading application at a computing device. The visual representation 1000 may display market data and/or personal trading information at an instant in time or over a duration of time. The visual representation 1000 may display the market data that was current at the identified time the user interface information was logged and/or the time of the session identified by the session identifier 1014.

As illustrated in FIGS. 10A-10D, the visual representation 1000 may include different levels of information. The different levels of information may allow creation of as information rich of a representation as the user may desire or allow. Each level of information may be logged, accessed by a computing device, and/or displayed in the visual representation 1000 based on a permission level. The permission level may be granted by a user of the application for which the visual representation is being displayed. For example, the user of each trading device may grant a permission level for the level of information allowed to be logged, accessed by a computing device, and/or displayed in the visual representation 1000. Each level may allow incrementally more information from the user interface to be logged, accessed by a computing device, and/or displayed in the visual representation 1000. A user may approve a permission level in real-time to allow the visual representation to be determined and/or displayed. The real-time approval of the permission level may allow a user to restrict access to the user's user interface information, market data accessed by the user, and/or personal financial information during certain times and allow access to user interface information, market data, and/or personal financial information during other times, such as during real-time troubleshooting of problems with the user interface at the user's computing device, for example.

Figure 11:
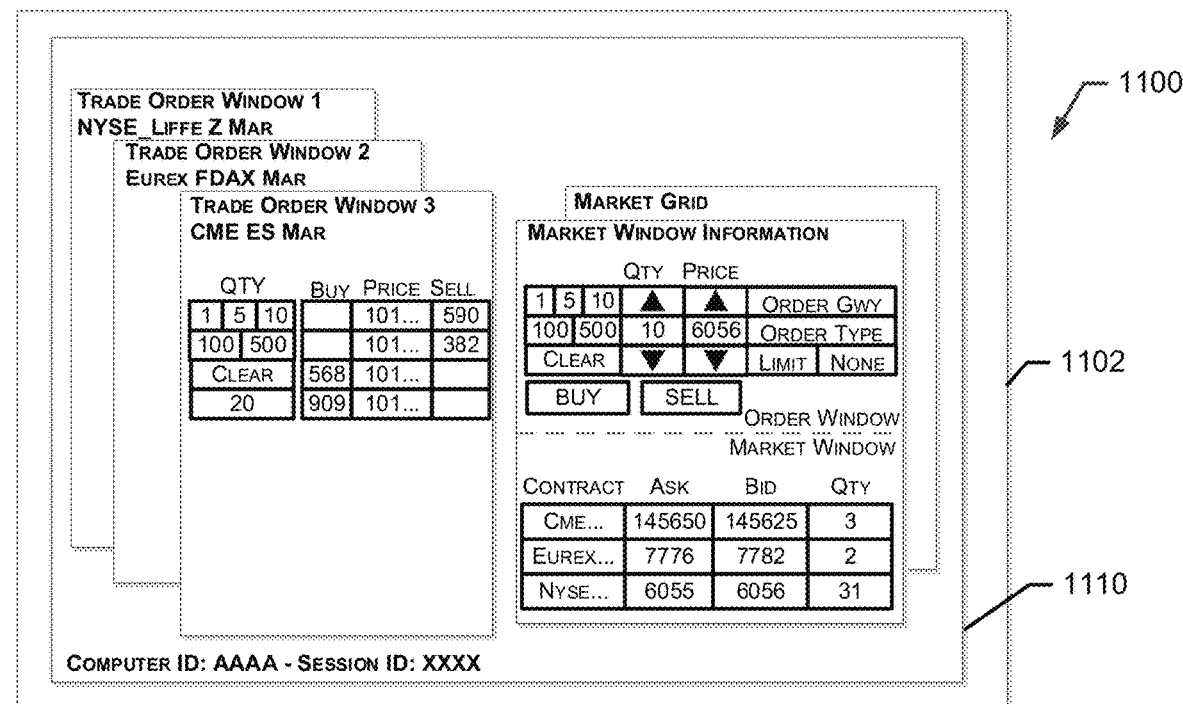
FIG. 11 illustrates a block diagram of an example system which may be implemented to display a visual representation of a user interface at a computing device.
Figure 11:
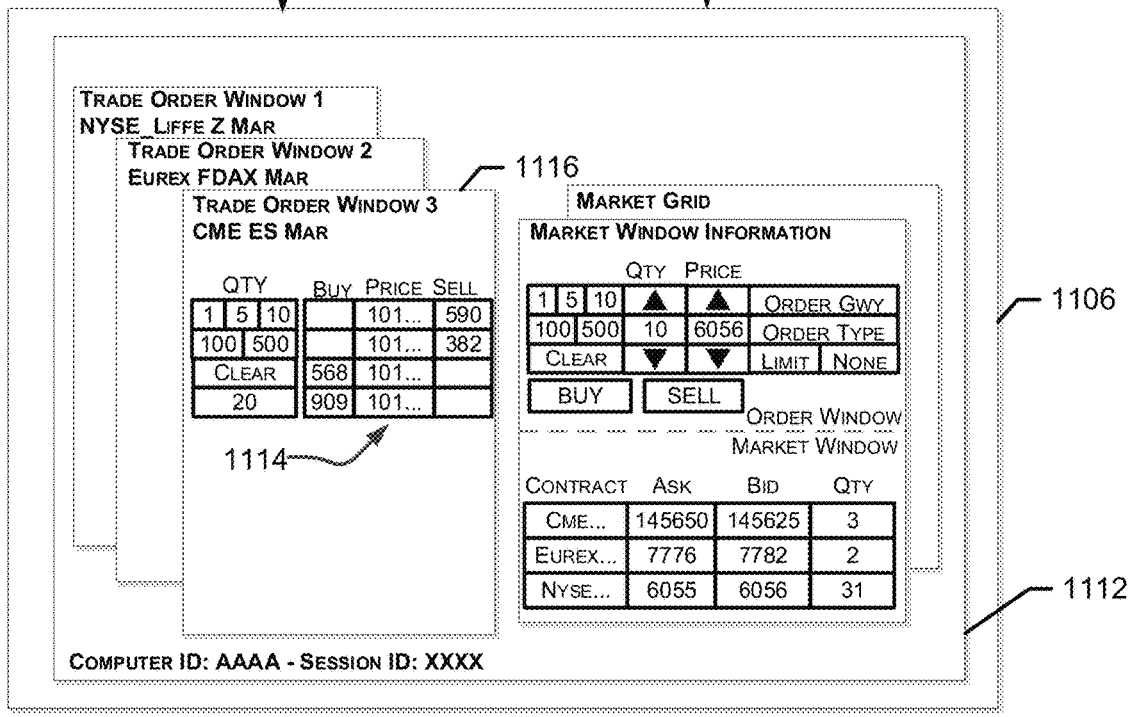

FIG. 11 illustrates an example system 1100 for displaying a visual representation of a user interface at a computing device. The system 1100 may include a computing device 1102 and a computing device 1106 that may communicate with each other directly or via the network 1104. The computing device 1102 may be a trading device, such as trading device 210 illustrated in FIG. 2, or a portion thereof, such as the trading terminal 214 or the server 212, for example. The computing device 1106 may be a trading device or another computing device that may communicate with the computing device 1102 to access information.

The computing device 1102 may run one or more applications that may provide a user interface 1110 for displaying information to and/or receiving information from a user. The user interface 1110 may include one or more configurable windows and/or functions. The windows may be trading application windows that may display market data via the user interface 1110. The data that is displayed in the user interface 110 may be received from a data source 1108. For example, the data may include market data that is received via a subscription from the data source 1108, which may be an electronic exchange or a gateway that may have access to the electronic exchange.

User interface information, such as display configuration information and/or user interaction information, may be logged at the computing device 1102 and may be sent to the computing device 1106 directly or via the network 1104. Based on the user interface information, the computing device 1106 may generate a visual representation 1112 that replicates one or more portions of the user interface 1110. For example, the computing device 1106 may determine the size and location of the windows at the user interface 1110 from the user interface information and may generate windows in the visual representation 1112, which may replicate the size and location of the windows in the user interface 1110. While the size and location of the windows in the user interface 1112 are provided as example types of information that may be logged at the computing device 1102 and/or indicated at the computing device 1106, other types of information are also described herein.

The computing device 1106 may have access to the same data source 1108 from which the computing device 1102 may receive data that may be displayed in the user interface 1110. The data source 1108 may be a remote data source, such as an electronic exchange or a gateway, to which the computing device 1106 may have a subscription for receiving the same data. The data source 1108 may be a part of the network 1104 or an independent data source to which the computing device 1102 and the computing device 1106 have access. The user interface information that is transmitted over the network 1104 may indicate the types of data displayed in the user interface 1110 from the data source 1108. The types of data may be indicated explicitly or implicitly. For example, user interface information may indicate that the user interface 1110 is displaying current price data or other market data for an identified exchange in a certain window and the computing device 1106 may access the price data for the identified exchange for being represented in the same window. In another example, the user interface information may identify a type of data implicitly by identifying the title of the window or other information in the display configuration that may indicate the data source 1108 and/or the information displayed from the data source 1108. As the computing device 1106 may know the display configuration of the user interface 1110, the computing device 1106 may determine the types of data to display from the data source 1108 and/or the location in which to display the data. For example, as the computing device 1106 may know the price data 1114 is displayed in the trading window 1116 and the trading window 1116 title indicates the exchange from which the data is being displayed, the computing device 1106 may obtain the price data 1114 from the exchange indicated in the title of the trading window 1116 and display such data in the identified location.

Using the user interface information received over the network 1104 and/or the data received from the data source 1108, the computing device 1106 may create a direct representation of the user interface 1110 at the computing device 1102. The direct representation of the user interface 1110 may be created without sending video information, in the form of encoded video pixels, over the network 1104. For example, each parameter of user interface information may be indicated using a sequence of bits (e.g., a ten-bit sequence or less). The windows in the user interface 1110 may be indicated with a bit sequence that indicates the window location (e.g., coordinates for the top right corner) and a bit sequence that indicates the size of the window (e.g., the height and width of the window). The user interface information may also include a bit sequence that indicates the location of the data in the window. The computing device 1106 may create a direct representation of the windows in the user interface 1110 based on the display configuration indicated in the bit sequences and the data received from the data source 1108. The computing device 1106 may create the direct representation of the windows in the user interface 1110 based on the user interface information, as the computing device 1106 may have knowledge of the application being used to generate the user interface 1110 at the computing device 1102. For example, the computing device 1106 may have the application parameters stored locally for creating a preconfigured representation of the user interface 1110. As the computing device 1106 may access the shared data source 1108 and any changes to the display configuration on the user interface 1110 via the user interface information, the computing device 1106 may create a direct representation of the user interface 1110, while transmitting lower data rates and using less bandwidth over the network 1104. This may allow for an increase in the speed at which information may be communicated over the network 1104 and reduced latency for transmissions over the network 1104.

FIG. 12 illustrates a method 1200 for creating and/or modifying a predefined display configuration. As shown in FIG. 12, user interface information may be received at a computing device, at 1210, from one or more other computing devices. At 1220, a predefined display configuration may be created or modified based on the received user interface information. A predefined display configuration may be created or modified by determining a number of application windows to display in the predefined display configuration; a size of the application windows to display in the predefined display configuration; a position in which to display the application windows in the predefined display configuration; a number of application functions to display in the application windows; a position in which to display the application functions in the application windows; a size of the application functions displayed in the application windows; a position, size, and/or font type for text in the application windows, and/or the like. A predefined display configuration may be modified by changing an existing predefined display configuration according to changes made by one or more users at a computing device. For example, when a group of users that use a predefined display configuration make the same changes to the predefined display configuration, the predefined display configuration may be modified to include the changes.

A predefined display configuration may be created or modified based on how users may be using the user interface. The predefined display configuration may include application windows and/or functions that are more frequently used than others. For example, the application windows that are displayed more often by users in the user interface may be determined based on the user interface information and may be included in the predefined display configuration. The functions that are used more often by users in the user interface may be determined based on the user interface information and may be included in the predefined display configuration. The number of application windows displayed in predefined display configuration may be determined based on the user interface information and may be included in the predefined display configuration. For example, the average number of windows displayed by a group of users may be determined based on the user interface information and may be used to create or modify a predefined display configuration. The time at which application windows and/or functions are used may be determined based on the user interface information. The predefined display configuration may include the application windows and/or functions that are used earlier by a user of the application.

A predefined display configuration may be modified or created to change the size and/or position of application windows and/or functions that are used more frequently. For example, in a trading application, a size of a 'BUY' button may be increased if the user interface information indicates that the 'BUY' button is used more frequently than other buttons, such as a 'SELL' button. A predefined display configuration may be modified or created to decrease a size of application windows and/or functions, or omit application windows and/or functions, that are used less frequently or that are not used. For example, the size of the 'SELL' button may be decreased if the user interface information indicates that the 'SELL' button is used less frequently than other buttons. The predefined display configuration may be changed based on a time period in which the application is being used. For example, the 'BUY' button may be used more frequently than the 'SELL' button on Mondays, so the size of the 'BUY' button may be greater than the size of the 'SELL' button on Mondays.

At 1230, the created or modified predefined display configuration may be sent to computing devices that may be displaying the user interface. The predefined display configuration may be sent to a computing from which the user interface information was received at 1210, for example. The predefined display configuration may be sent as an application update, such as a batch update to one or more computing devices. The application update may modify the display configuration of the user interface of the application. The predefined display configuration may be sent in response to a request from an application on a computing device. The predefined display configuration may be sent in response to a runtime error or other problem identified with the application running at a computing device. The identified problem may be a problem with the current display configuration at the user's computing device.

A predefined display configuration may be a part of a profile or a user profile. For example, a predefined display configuration may be implemented upon selection of a profile name or identifier. The profile may include a display configuration that may be specific to a user type. For example, each profile may include different display configurations for different traders or groups of traders.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A computing device comprising:
a first display; and
a processor coupled with the first display and in communication by a first connection to a second computing device having a second display, wherein the second computing device runs an application providing information to a user interface provided on the second display of the second computing device and functionality to a user of the second computing device, wherein the user interface includes a user-configurable number of application windows each having a user-configurable size and position relative to the second display, and wherein the application running on the second computing device processes a first market data received by a second connection to a remote data source to display the first market data in the user interface of the second computing device, the processor being configured to:
receive from the second computing device user interface information associated with the application running on the second computing device, wherein the user interface information indicates the remote data source from which the first market data is displayed in the user interface on the second display of the second computing device and comprises at least one of:
1) display configuration information that indicates a display configuration of the user interface on the second display of the second computing device, and
2) user interaction information that indicates a user interaction with the user interface on the second display of the second computing device;
establish at the computing device a third connection to the indicated remote data source from which the first market data is received;
receive at the computing device by the third connection to the remote data source a second market data, wherein the second market data is a second instance of the first market data indicated in the user interface information;
generate at the computing device based on the user interface information and the second market data from the remote data source visual representation that indicates at least one of the display configuration of the user interface and the user interaction with the user interface on the second display of the second computing device; and
display the generated visual representation on the first display of the computing device.

2. The computing device of claim 1, wherein the display configuration information indicates a size of each application window associated with the user interface on the second display of the second computing device, and wherein the visual representation comprises a window object that corresponds in size to the size of the application window.

3. The computing device of claim 1, wherein the display configuration information indicates a position of each application window associated with the user interface on the second display of the second computing device, and wherein the visual representation comprises a window object that corresponds in position to the position of the application window.

4. The computing device of claim 1, wherein the display configuration information indicates a number of application windows activated by a user of the application on the second computing device over a period of time, and wherein the visual representation on the display identifies the number of application windows activated by the user over the period of time.

5. The computing device of claim 1, wherein the user interaction information indicates at least one of a position of a user selection or a number of user selections associated with the user interface on the second display of the second computing device over a period of time, and wherein the visual representation indicates the at least one of the position of the user selection or the number of user selections over the period of time.

6. The computing device of claim 5, wherein the visual representation indicates a plurality of user selections within a predetermined distance from each other using a single indicium.

7. The computing device of claim 1, wherein the processor is further configured to:
receive user interface information associated with a third computing device; and
determine the visual representation based on the user interface information associated with the third computing device.

8. The computing device of claim 1, wherein the processor is further configured to provide a user profile that is based on the user interface information, wherein the user profile indicates a predefined display configuration for the application.

9. The computing device of claim 1, wherein the second computing device comprises a financial trading device, wherein the application comprises a financial trading application, and wherein the visual representation omits at least one of market data or personal financial data used by the financial trading application on the financial trading device.

10. The computing device of claim 1, wherein the processor is further configured to:
identify, based on the user interaction information, at least one portion of the user interface that is used more frequently than other portions of the user interface;
determine, based on the identified at least one portion of the user interface, an application update for the application that modifies the display configuration of the user interface; and
send the application update to the second computing device.

11. The computing device of claim 1, wherein the visual representation comprises a real-time representation of the user interface associated with the application on the second computing device.

12. The computing device of claim 1, wherein the processor is configured to:
query a data store for the user interface information; and
receive the user interface information in response to the query.

13. The computing device of claim 12, wherein the processor is configured to:
receive, from the second computing device, a permission level that indicates a level of information available in the data store; and
query the data store for the user interface information based on the permission level.

14. A computing device comprising:
a first display; and
a processor coupled with the first display and in communication by a first connection to a second computing device having a second display, wherein the second computing device runs a trading application providing information to a user interface on the second display of the second computing device and functionality to a user of the second computing device, wherein the user interface includes a user-configurable number of trading application windows each having a user-configurable size and position relative to the second display, and wherein the trading application running on the second computing processes a first market data received by a second connection to a remote data source to display the first market data in the first user interface of the second computing device, the processor being configured to:
receive from the second computing device display configuration information that indicates a display configuration of the user-configurable number of trading application windows displayed on the second computing device, wherein the display configuration information indicates the remote data source from which the first market data is displayed in the trading application window;
establish at the computing device a third connection to the indicated remote data source from which the first market data is received;
receive at the computing device by the third connection to the remote data source a second market data, wherein the second market data is a second instance of the first market data indicated in the display configuration information;
generate at the computing device a visual representation of the trading application, wherein the visual representation of the trading application window is generated based on the display configuration information and the second market data from the remote data source; and
display by the first display the generated visual representation of the trading application window, wherein the visual representation includes the display configuration of the trading application window displayed on the second computing device and the second market data from the remote data source.

15. The computing device of claim 14, wherein the data is received from the remote data source via a data feed that is shared with the second computing device.

16. The computing device of claim 15, wherein the data feed is provided via a gateway.

17. The computing device of claim 15, wherein the data feed is representative of trading activity in a market operating at an electronic exchange.

18. The computing device of claim 14, wherein the visual representation comprises a window object, wherein the window object has a size that is proportional to a size of the trading application window, and wherein the window object has a position in the visual representation that corresponds to a position of the trading application window in the trading application window.

19. The computing device of claim 14, wherein the remote data source comprises an electronic exchange, and wherein the visual representation displays the same market data from the electronic exchange as the trading application window.

* * * * *